(12) United States Patent
French

(10) Patent No.: US 8,909,912 B2
(45) Date of Patent: Dec. 9, 2014

(54) APPARATUS AND METHOD FOR CONFIGURING A TARGET MACHINE WITH CAPTURED OPERATIONAL STATE COMPRISING A STATIC MACHINE PROFILE AND A DYNAMIC MACHINE STATE TO CONTINUE OPERATIONS OF A SOURCE MACHINE

(75) Inventor: James P. French, Millstone Township, NJ (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 13/193,704

(22) Filed: Jul. 29, 2011

(65) Prior Publication Data

US 2013/0031342 A1    Jan. 31, 2013

(51) Int. Cl.
| | | |
|---|---|---|
| G06F 9/00 | (2006.01) | |
| G06F 15/177 | (2006.01) | |
| G06F 9/44 | (2006.01) | |
| G06F 9/48 | (2006.01) | |
| G06F 9/06 | (2006.01) | |
| G06F 17/30 | (2006.01) | |
| G06F 9/455 | (2006.01) | |

(52) U.S. Cl.
CPC ............ *G06F 9/4856* (2013.01); *G06F 9/4418* (2013.01); *G06F 9/06* (2013.01); *G06F 17/30079* (2013.01); *G06F 9/45541* (2013.01)
USPC .......................................................... 713/2

(58) Field of Classification Search
CPC ... G06F 9/4418; G06F 9/06; G06F 17/30079; G06F 9/4856
See application file for complete search history.

(56) References Cited

U.S. PATENT DOCUMENTS 7,080,159 B2 *   7/2006   Chu et al. ....................... 709/246
7,886,183 B2 *   2/2011   Krishnan et al. ............. 714/5.11
(Continued)

FOREIGN PATENT DOCUMENTS

EP          1962192 A1      8/2008

OTHER PUBLICATIONS

International Search Report and Written Opinion in counterpart International Application No. PCT/US2012/048489, mailed Oct. 9, 2012.

(Continued)

*Primary Examiner* — Thomas Lee
*Assistant Examiner* — Zhipeng Wang
(74) *Attorney, Agent, or Firm* — Edell, Shapiro & Finnan, LLC

(57) ABSTRACT

According to one embodiment, an apparatus comprises a physical computing device including a network interface configured to enable communications over a network, and at least one processor. The apparatus captures an operational state of the physical computing device including information pertaining to a state of the physical computing device resulting from operations performed by the physical computing device. The apparatus further configures the physical computing device with the operational state captured from a desired computing device to continue operations of the desired computing device on the physical computing device. Embodiments may further include a method and computer-readable media encoded with software for the storage and transfer of physical machine state in substantially the same manner described above.

23 Claims, 8 Drawing Sheets

(56) References Cited

U.S. PATENT DOCUMENTS

| | | | |
|---|---|---|---|
| 8,407,702 B2* | 3/2013 | Ikegaya et al. | 718/1 |
| 2002/0103779 A1* | 8/2002 | Ricart et al. | 707/1 |
| 2003/0208675 A1 | 11/2003 | Burokas et al. | |
| 2005/0246565 A1 | 11/2005 | Koarai | |
| 2006/0153188 A1* | 7/2006 | Doi et al. | 370/389 |
| 2008/0028402 A1 | 1/2008 | Senoo | |
| 2009/0150463 A1* | 6/2009 | Sekiguchi et al. | 707/204 |
| 2009/0157882 A1* | 6/2009 | Kashyap | 709/227 |
| 2009/0327392 A1* | 12/2009 | Tripathi et al. | 709/201 |
| 2011/0265084 A1* | 10/2011 | Knowles et al. | 718/1 |
| 2012/0227058 A1* | 9/2012 | Hunt et al. | 719/318 |
| 2013/0007455 A1* | 1/2013 | Jaber et al. | 713/171 |

OTHER PUBLICATIONS

Chiang, et al., Bootstrapped Migration for Linux OS, ICAC-11, Karlsruhe, Germany, Jun. 14-18, 2011, pp. 1-4.

Kozuch, et al., "Migration without Virutalization," Proceedings of the 12th Conference on Hot Topics in Operating Systems, May 18, 2009.

Chiang, et al., "Physical Machine Stage Migration," 2011 IEEE International Conference on Parallel and Distributed Systems, Dec. 7, 2011, pp. 25-32.

http://www.vmware.com/products/vmotion/overview.html, "VMware vSphere," retrieved from Internet Jul. 7, 2011, pp. 1-2.

http://pubs.vmware.com/vsp40_i/admin/c_migrating_virtual_machines.html, "Vmware ESXi 4.0 Installable and vCenter Server 4.0 Edition," retrieved from Internet Jul. 7, 2011, p. 1.

* cited by examiner

APPARATUS AND METHOD FOR CONFIGURING A TARGET MACHINE WITH CAPTURED OPERATIONAL STATE COMPRISING A STATIC MACHINE PROFILE AND A DYNAMIC MACHINE STATE TO CONTINUE OPERATIONS OF A SOURCE MACHINE

TECHNICAL FIELD

The present disclosure relates to computer systems and, more specifically, to the capture, storage, and transfer of the state of a physical machine (e.g., including software executing on the physical machine, etc.) via an enhanced basic input/output system (BIOS) of the physical machine.

BACKGROUND

Server administrators suffer from physical server sprawl and encounter difficult change control with respect to numerous applications. The model employed provides for execution of one application per operating system (OS) on a single server system. However, a large enterprise may include thousands of applications. Although most of the applications do not require more than a single physical machine to scale, the applications may be deployed on two physical server systems via server load balancing or clustering to provide high availability. Hypervisors emulate physical hardware and host multiple virtual machines (VM) offering server administrators efficiency and portability of the hosted virtual machine (VM) workloads. A physical machine may host tens or hundreds of virtual machines (VMs), thereby resulting in virtual machine (VM) sprawl. Users have the ability to snapshot, clone, or live migrate virtual machines (VMs), where the hypervisor consumes resources in the physical machine. However, the user still has to manage the individual virtual machines (VMs). In addition, there is a trend toward fewer larger applications that eventually diminishes the need for a hypervisor. Large Software-As-A-Service (SAAS) deployments or enterprise critical applications (e.g., SAP, Oracle, etc.) are often not deployed on a hypervisor, but rather execute on a physical machine. Thus, these and other cases are at the physical machine level, where hypervisors and similar virtual tools are inadequate.

DESCRIPTION OF EXAMPLE EMBODIMENTS

Overview

According to one embodiment, an apparatus comprises a physical computing device including a network interface configured to enable communications over a network, and at least one processor. The apparatus captures an operational state of the physical computing device including information pertaining to a state of the physical computing device resulting from operations performed by the physical computing device. The apparatus further configures the physical computing device with the operational state captured from a desired computing device to continue operations of the desired computing device on the physical computing device. Embodiments may further include a method and computer-readable media encoded with software for the storage and transfer of physical machine state in substantially the same manner described above.

Example Embodiments

Embodiments described herein are directed to the capture, storage, and transfer of the state of a physical machine (e.g., including software executing on the physical machine, etc.). The state of a physical machine typically includes the basic input/operating system (BIOS), firmware, physical attribute state (e.g., contained in a service profile), and the state of the physical machine within the processors and memory during operation or execution. The physical machine represents the hardware presented to an operating system (e.g., WINDOWS, LINUX, etc.). The operating system may be a hypervisor that emulates a physical server computer system to provide an emulated hardware environment for operating systems.

The operating or execution state of the physical machine may be saved for utility computing, or to move the currently operating physical machine to a new similar system. The service profile abstracts the physical machine state, and defines the hardware characteristics of a physical machine (e.g., a server system). Present embodiments extend the service profile to manage the physical machine or server system state including the operating state of the server system (e.g., that may include on the order of thousands of Gigabytes (GB) of memory state). The operating physical machine memory state typically includes the hypervisor (if used), operating systems (OS), and applications. Since the hypervisor resides within the physical machine, the hypervisor may not be employed for physical machine mobility. However, the basic input/output system (BIOS) of a physical machine is a software layer that resides below the hypervisor (or outside the operating system or similar level environment of the physical machine) and, therefore, is employed to capture the physical machine operating state, and transfer that state to persistent storage or another similar machine (e.g., physical machine live migration), preferably through a coordination point.

Figure 1A:
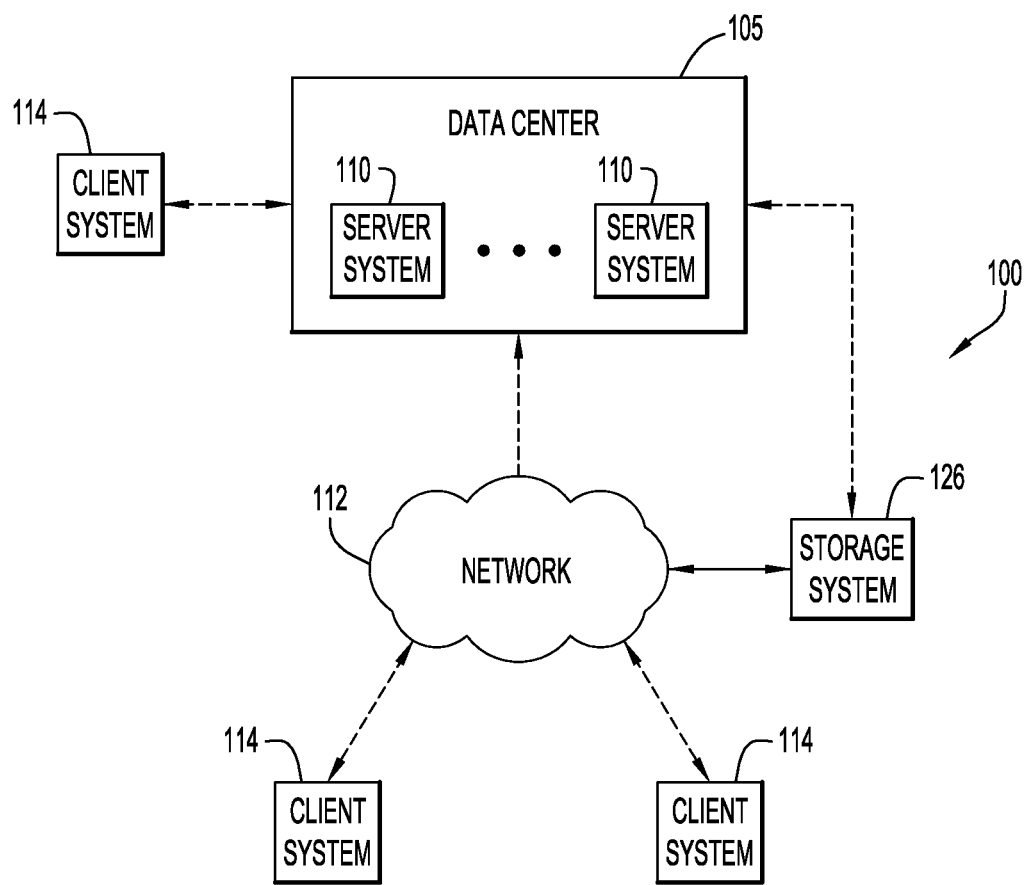
FIG. 1A is a diagrammatic illustration of an example network topology or environment for storing and transferring physical machine state according to an embodiment.

An example network topology for storing and transferring physical machine state according to an embodiment is illustrated in FIG. 1. Specifically, topology 100 includes a data center 105, one or more client or end-user systems 114, and a storage system 126. Data center 105 includes one or more server systems 110 providing various services for client systems 114. One or more server systems 110 may alternatively reside within the topology external of the data center. The server systems may be equipped with software including basic operating systems (OS) with applications, or basic hypervisors with virtual machines (VMs) that contain the operating system and applications. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to interact with the services provided by server systems 110 to perform various desired actions (e.g., execute various applications from remote desktops, store and retrieve information, etc.). Server systems 110 and client systems 114 include various modules to facilitate storage and transfer of physical machine state as described below. Server systems 110 and/or client systems 114 may present a graphical user interface (e.g., GUI, desktop, etc.) or other interfaces (e.g., command line prompts, menu screens, etc.) to solicit information from users concerning desired actions.

Storage system 126 stores information for transfer of physical machine state. The storage system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.).

Figure 1B:
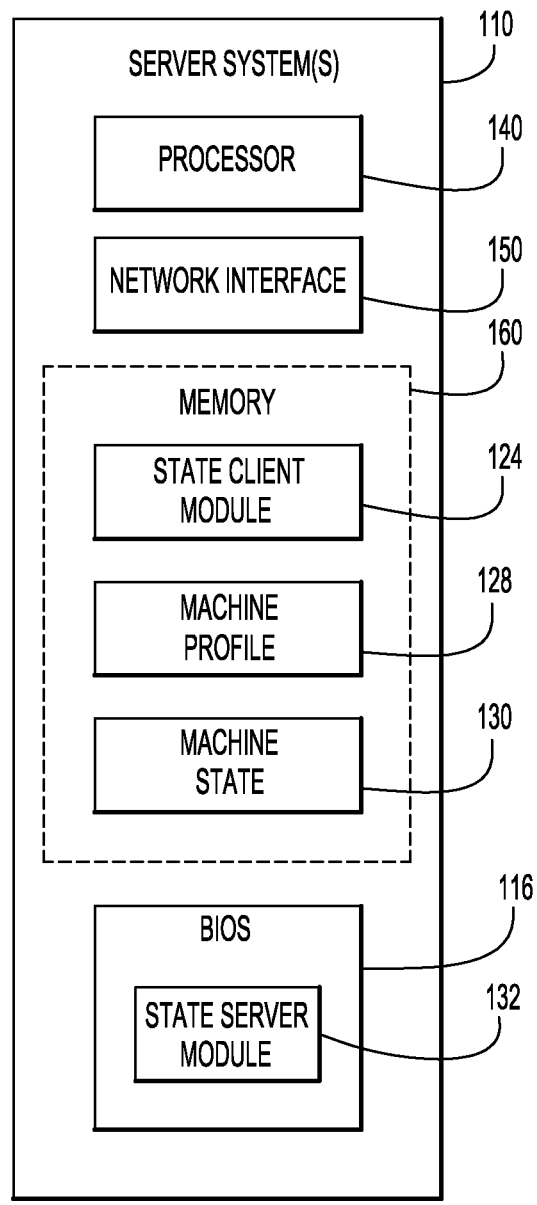
FIG. 1B is a block diagram of modules within a server system for storing and transferring physical machine state according to an embodiment.

Referring to FIG. 1B, server systems 110 may be implemented by any conventional or other computer systems preferably equipped with a display or monitor, a base (e.g., including processor 140, memories 160, BIOS 116, and/or internal or external communications devices or network interface 150 (e.g., modem, network cards, etc.)), optional input devices (e.g., a keyboard, mouse or other input device), and any commercially available and/or custom software (e.g., server/communications software, machine state storage and transfer software, etc.).

Server system 110 further includes various information within memory 160 pertaining to the state of the physical server system. In particular, memory 160 includes a machine profile 128 and a machine state 130. Machine profile 128 is basically meta data that describes the state of the physical machine or server system 110. This state is associated with a static configuration of the physical machine prior to booting and loading of an operating system. Machine profile 128 includes a service profile indicating the configuration and hardware state (e.g., static or stateless configuration) for the core physical machine, and extensions for optional components (e.g., graphics processors, Secure Sockets Layer (SSL) offloaders, plug-in components, etc.). The service profile includes a server definition, identity information, firmware revision specifications, and connectivity definition. The server definition defines the resources (e.g. a specific server system (or a server system implemented in the form of blade inserted within a specific chassis)) that apply to the service profile. The identity information includes a Universally Unique Identifier (UUID), Media Access Control (MAC) address for each virtual network interface card (vNIC), and World Wide Name (WWN) specifications for each host bus adapter (HBA) for connection to other devices. The firmware revision specifications are used when a certain tested firmware revision is required to be installed, or other specific firmware is utilized. The connectivity definition is used to configure network adapters, fabric extenders, and parent interconnects (e.g., however this information typically lacks the configuration for each network component).

The service profile is created by a server administrator, and leverages configuration policies that are created by server, network, and storage administrators. Server administrators may further employ a service profile template to ease creation of service profiles. A service profile template may be derived from a service profile with the server and I/O interface identity information abstracted (e.g., the service profile template may specify the location of Universally Unique Identifier (UUID), Media Access Control (MAC) address, and World Wide Name (WWN) values, rather than indicate their exact values, etc.). For example, a service profile template may specify the standard network connectivity for a web server, and the pool from which the MAC addresses of the web server interfaces may be obtained. Service profile templates may be used to provision numerous servers with the same simplicity as provisioning a single server.

The types of service profiles include types that respectively inherit and override server identity. The service profile type that inherits server identity is similar in concept to a rack mounted server, and uses burned-in values (e.g., Media Access Control (MAC) addresses, World Wide Name (WWN) addresses, basic input/output system (BIOS) version and settings, etc.) of the hardware. However, this type of profile is not easily portable, and cannot be used for moving one server system to another due to the nature of using the burned-in values. In other words, this type of service profile exhibits the nature of a one-to-one mapping, thereby requiring changes when the service profile is moved from one server system to another.

The service profile type that overrides server identity exhibits the nature of stateless computing, and employs the resources (e.g., Media Access Control (MAC) addresses, World Wide Name (WWN) addresses, basic input/output system (BIOS) version, etc.) from a resource pool. The settings or values from the resource pool override the burned-in values of the hardware. Thus, this type of profile is very flexible, and may be moved from one server system to another while being transparent to a network. In other words, this type of service profile provides a one-to-many mapping, and requires no changes when moving the service profile from one server system to another.

Machine profile 128 extends the stateless concept of the service profile to accessories, plug-in components, and peripheral devices (e.g., Graphics Processor Units (GPU), Secure Sockets Layer (SSL) accelerator, encryption offload, etc.). If peripherals or plug-in components are used, machine profile 128 includes peripheral BIOS and configuration information (e.g., interrupt request (IRQ) settings, etc.).

Machine state 130 includes the operating or executing state for the primary and supporting processors and memory (e.g., graphics processors, Secure Sockets Layer (SSL) offloaders, etc.). This state is associated with the physical machine after booting and loading of the operating system, and typically further reflects execution of applications. In particular, the machine state includes Small Computer System Interface (SCSI) target, Media Access Control (MAC) address, Universally Unique Identifier (UUID), World Wide Port Name (WWPN), server name, boot order, basic input/output system (BIOS) firmware, and other information pertaining to the operating (or dynamically changing) state of the physical machine (e.g., contents of the machine memories (e.g., random access memory (RAM), memory for working storage, program and other stacks or registers, etc.)). In addition, the execution or operating state of peripherals may be included when peripherals are employed.

Server system 110 includes various modules to store and transfer physical machine state. Specifically, server system 110 includes basic input/output system (BIOS) 116 and a state server module 132. The state server module preferably resides within BIOS 116 for execution (e.g., outside (and preferably below) the operating system or similar level environment, etc.). However, the state server module may reside within any desired location of sever system 110 providing execution outside (and preferably below) the operating system or similar level environment (e.g., within an independent memory, implemented as a hardware module (independent of server software), etc.). State server module 132 is initiated in response to operation of BIOS 116 during booting of server system 110. The state server module captures the current machine profile 128 and machine state 130 (e.g., pausing server system 110, tracking changes during transfer of the machine profile and machine state to another environment (or physical machine) until the two physical machines are substantially identical, etc.) as described below. State server module 132 stores the state of server system 110 within static storage (e.g., storage system 126, physical disk, solid state storage, RAM disk, etc.) and/or transfers the state to another similar physical machine (e.g., memory, BIOS, etc.). In addition, the state server module may receive a physical machine state from another physical machine or from storage for restoration of that physical machine.

Figure 1C:
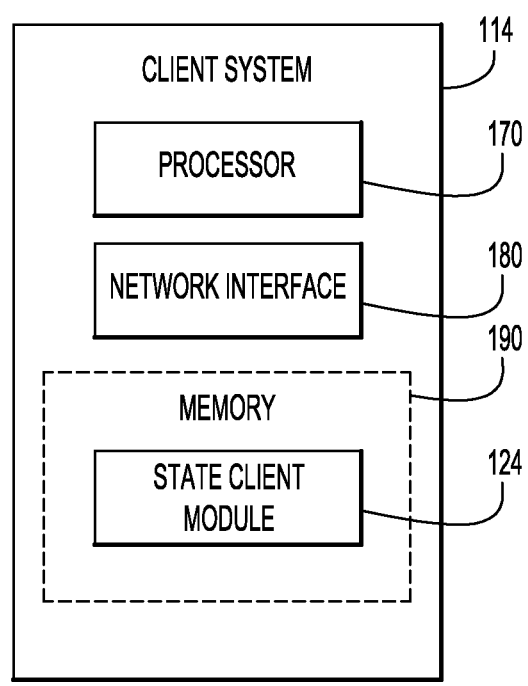
FIG. 1C is a block diagram of modules within a client system for storing and transferring physical machine state according to an embodiment.

State server module 132 is responsive to a state client module 124 as shown in FIG. 1C. The state client module controls storage and transfer of the physical machine state, and may reside on a server system 110 and/or a client system 114 (e.g., within respective memories 160, 190 (FIGS. 1B and 1C)). The state client module requests a corresponding state server module 132 of a server system 110 to capture the state of the underlying operating physical machine (hosting that server system and state server module) and/or to transfer the underlying operating machine to another similar physical machine. State client module 124 may utilize requests in the form of commands to direct state server module 132 to store and transfer the physical machine state as described below. For example, state client module 124 may issue commands to state server module 132 to copy the physical machine state to static storage or to the memory or BIOS of another physical machine, or to receive a physical machine state of another machine and restore that other machine on the physical machine hosting the state server module.

State client module 124 indicates within the requests when to start the state capture (e.g., immediately or at a scheduled time), the target resource, and any translation required. If the target resource is storage (e.g., in order to return the stored machine to the same physical machine with an identical machine profile), the state client module simply identifies the target resource along with the associated machine profile and machine state. When a translation is required in cases where the machine target resource is not identical to the captured physical machine (or some hardware accessory is missing) (e.g., Secure Sockets Layer (SSL) offload), state client module 124 may intermediate to provide translation or an error message. State client module 124 is accessible or controlled by an external Application Programming Interface (API) and/or an integrated management graphical user interface. The stored target resource (e.g., storage system 126) may be traditional storage (e.g., Direct Attached Storage (DAS), Networked Attached Storage (NAS), Storage Area Network (SAN), etc.), and accessible via various techniques (e.g., Network File System (NFS), Internet Small Computing System Interface (iSCSI), Fiber Channel, etc.), while the operating target machine is another similar physical machine that is hosting state server module 132.

Referring to FIG. 1C, client systems 114 may be implemented by any conventional or other computer systems preferably equipped with a display or monitor, a base (e.g., including processor 170 (FIG. 1C), memories 190 and/or internal or external communications devices or network interface 180 (e.g., modem, network cards, etc.)), optional input devices (e.g., a keyboard, mouse or other input device), and any commercially available and/or custom software (e.g., machine state software, browser/interface software, etc.). Alternatively, client systems 114 may further be implemented by any type of computer or processing device (e.g., laptop, personal digital assistant (PDA), mobile/cellular telephone devices, mobile devices (e.g., pads or tablets), etc.). Client systems 114 typically include state client module 124 (e.g., within memory 190) to control storage and transfer of a physical machine state as described below.

The various modules of server and client systems 110, 114 (e.g., state server module 132, state client module 124, etc.) may be implemented by any combination of any quantity of software and/or hardware modules or units, and may reside within any of the respective memories 160, 190, and/or BIOS 116 of those systems for execution by corresponding processors.

Figure 2:
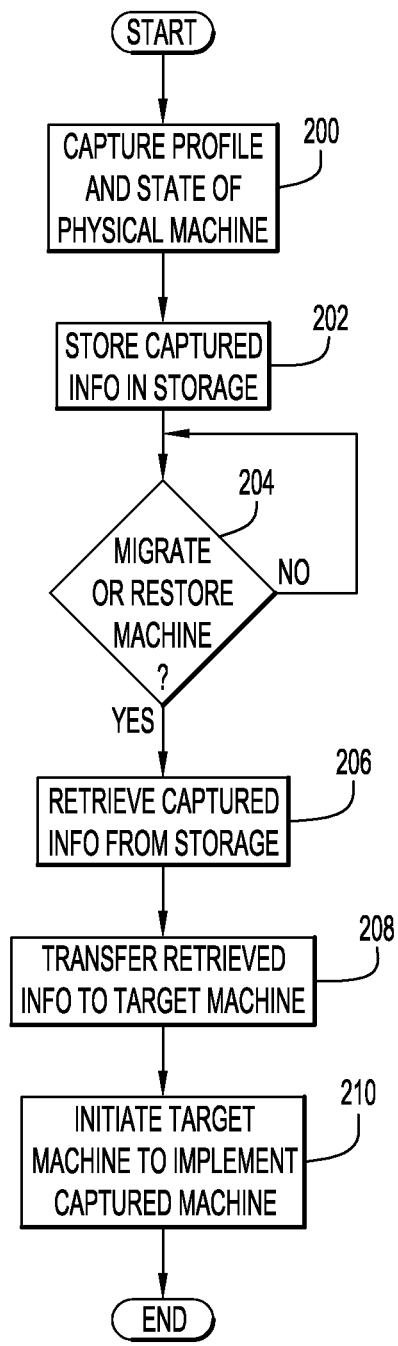
FIG. 2 is a procedural flow chart illustrating a manner in which a state of a physical machine is stored and transferred according to an embodiment.

A manner in which a physical machine state is stored and/or transferred by server and/or client systems 110, 114 (e.g., via state client and server modules 124, 132) is illustrated in FIG. 2. Initially, state client module 124 of a server or client system 110, 114 initiates storage and/or transfer of a state of a desired physical machine. This initiation may be in response to a predetermined activity (e.g., a scheduled time, occurrence of a certain fault or other condition, etc.), or a request from a user (e.g., entered via a graphical user or other interface, etc.) interacting with the server or client system. State client module 124 of the server or client system transmits a request to state server module 132 of the desired physical machine (or server system 110) the state of which is to be stored and/or transferred. In response to this request, state server module 132 of the desired physical machine captures or retrieves machine profile 128 and machine state 130 at step 200. The captured machine profile and state are stored in storage system 126 at step 202. The state server module may generate an identifier for the captured operational state to enable subsequent retrieval from storage system 126 in order to restore the physical machine.

When a request for transfer of the captured physical machine is issued by state client module 124 and received by state server module 132 of a target physical machine to receive the captured physical machine state as determined at step 204, the state server module retrieves the stored machine state from storage system 126 at step 206. The stored machine state may be identified by any suitable identifier that is preferably received within the request. Once the state of the physical machine is retrieved from storage system 126, the retrieved state is provided to the target physical machine at step 208. The target physical machine may be the same or a different physical machine from which the physical machine state was captured. For example, the state of a physical machine may be captured and stored, and subsequently retrieved and returned to the same physical machine. This enables the operation of the physical machine to be interrupted or suspended for various tasks (e.g., maintenance, replacement of hardware, conserving power during low utilization, etc.), and restored upon completion of those tasks based on the stored machine state. Further, a physical machine state may be stored, and provided to another similar physical machine. The other physical machine may be configured based on the stored physical machine state to effectively transfer a physical machine to another similar physical machine.

When the stored physical machine state has been received by the target physical machine, the target physical machine is configured based on that state and initiated to implement the captured physical machine at step 210. Since the information within the stored physical machine state (e.g., machine profile 128 and machine state 130) reflects the operating state of the physical machine at the time of capture, the target physical machine may be configured to operate in substantially the same manner as the captured physical machine from the point of the capture.

Figure 3:
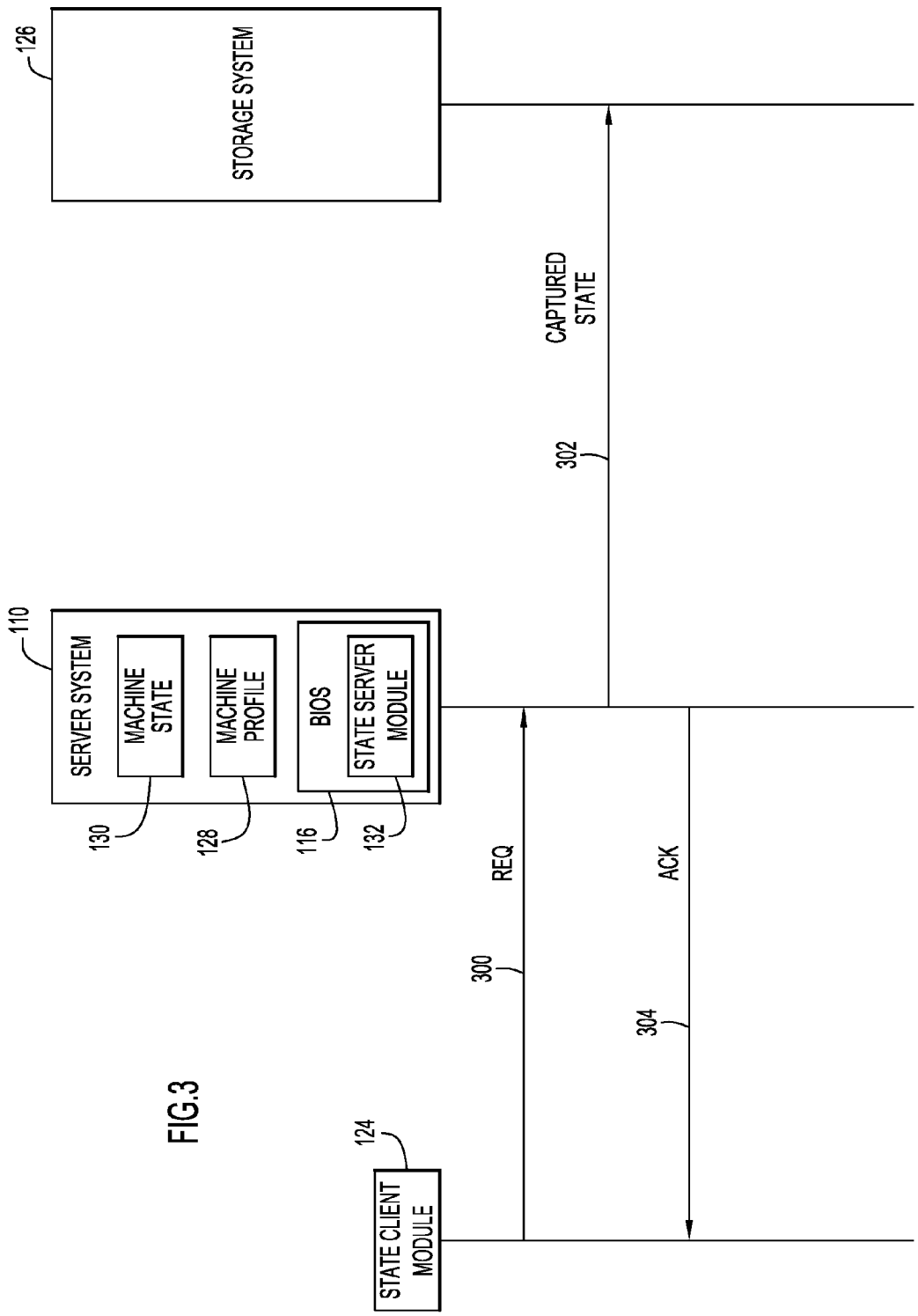
FIG. 3 is a flow diagram of a manner of storing a physical machine state according to an embodiment.

Operation of an embodiment to store a physical machine state is illustrated, by way of example, in FIG. 3. The storage of a physical machine state provides various advantages. For example, a physical machine may be suspended or interrupted to reduce data center power and cooling energy consumption, and to manage computing requirements (e.g., control deployment of the physical machine (e.g., based on the time of day, day of the week, quarter of the year, end of the year, etc.)). Further, the storage of the physical machine state may be employed for physical and virtualized environments, provides no computing overhead, and avoids the need for re-booting of the system for a subsequent session.

Initially, state client module 124 of a server or client system 110, 114 initiates storage of a state of a desired physical machine. This initiation may be in response to a predetermined activity (e.g., a scheduled time, occurrence of a certain fault or other condition, etc.), or a request from a user (e.g., entered via a graphical user or other interface, etc.) interacting with the server or client system. State client module 124 of the server or client system transmits a request to state server module 132 of the desired physical machine (or server system 110) the state of which is to be stored at flow 300. By way of example, the request may be in the form of one or more commands, and include a pause command and a push command. The state server module processes the pause command, and freezes the operational state of the physical machine to avoid further changes. The operational state (e.g., machine profile 128 and machine state 130) is captured, and the push command is processed to direct state server module 132 to transfer the captured operational state (e.g., machine profile 128 and machine state 130) from the physical machine to storage system 126 at flow 302.

Once the operational state of the physical machine is stored in storage system 126, the physical machine is released and no longer contains the operational state. The state server module may generate an identifier for the captured operational state to enable subsequent retrieval in order to restore the physical machine. In addition, the push command may include a parameter (e.g., Uniform Resource Locator (URL) or other address, device or system, etc.) to designate a desired location or destination to store the captured operational state. State server module 132 sends an acknowledgment to state client module 124 to indicate completion of storage of the physical machine state at flow 304. The acknowledgment may include the identifier for the captured operational state to enable subsequent retrieval in order to restore the physical machine.

Figure 4:
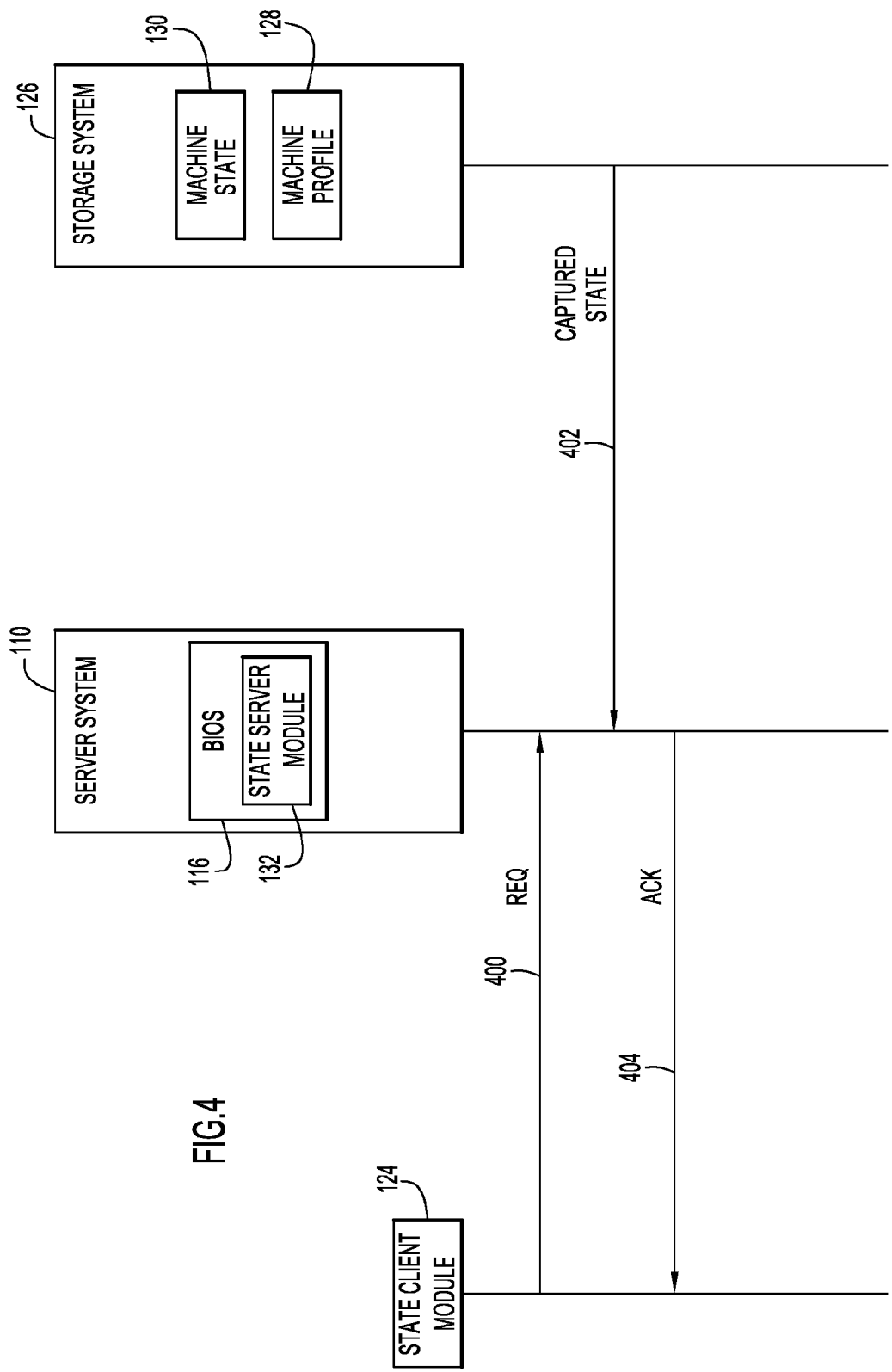
FIG. 4 is a flow diagram of a manner of restoring a physical machine from a stored physical machine state according to an embodiment.

Operation of an embodiment to retrieve a physical machine state and restore the physical machine is illustrated, by way of example, in FIG. 4. The restoration of a physical machine state provides various advantages. For example, the physical machine is restored to the original operating state, while avoiding the need to re-boot the system for a subsequent session. Further, the restoration may be employed to preserve the state of hosted virtual desktops (HVD) during periods when the desktops are not being utilized. In this case, operation of the physical machine providing the desktop may be interrupted or suspended to conserve power or perform tasks (e.g., maintenance, etc.).

Initially, a physical machine state (e.g., machine profile 128 and machine state 130) is captured and stored in storage system 126 in substantially the same manner described above. State client module 124 of a server or client system 110, 114 initiates retrieval of the stored physical machine state. This initiation may be in response to a predetermined activity (e.g., a scheduled time, occurrence of a certain fault or other condition, etc.), or a request from a user (e.g., entered via a graphical user or other interface, etc.) interacting with the server or client system. State client module 124 of the server or client system transmits a request to state server module 132 of a physical machine (or server system 110) designated to receive the retrieved state at flow 400. The designated physical machine may be the same or a different physical machine than the captured physical machine. By way of example, the request may be in the form of one or more commands, and includes a get command. The state server module processes the get command, and retrieves the stored physical machine state from storage system 126. The state server module may provide an identifier within the request to enable retrieval of the state of a specific physical machine. In addition, the get command may include one or more parameters (e.g., Uniform Resource Locator (URL) or other address, device or system, identifier for the captured physical machine state, etc.) to designate a desired location or destination from which to retrieve the captured physical machine state, and/or to indicate the specific physical machine state to be retrieved.

The stored physical machine state (e.g., machine profile 128 and machine state 130) is retrieved and transferred from storage system 126 to the designated physical machine at flow 402. State server module 132 of the designated physical machine configures that machine based on the retrieved state to implement the captured physical machine. Since the information within the stored physical machine state (e.g., machine profile 128 and machine state 130) reflects the operating state of the physical machine at the time of capture, the designated physical machine may be configured to operate in substantially the same manner as the captured physical machine from the point of the capture.

The request from state client module 124 for retrieval of the captured physical machine state may include a start command to control restoration of the captured physical machine. For example, the start command may indicate an immediate restoration upon receipt of the retrieved physical machine state, a predetermined time for the restoration, and/or conditions triggering the restoration. Alternatively, a start command may subsequently be issued by state client module 124 for state server module 132 at a later time to initiate restoration of the captured physical machine. In this case, the physical machine receiving the captured state remains idle until receipt of the start command from the state client module. State server module 132 sends an acknowledgment to state client module 124 to indicate completion of the restoration of the physical machine at flow 404.

Figure 5:
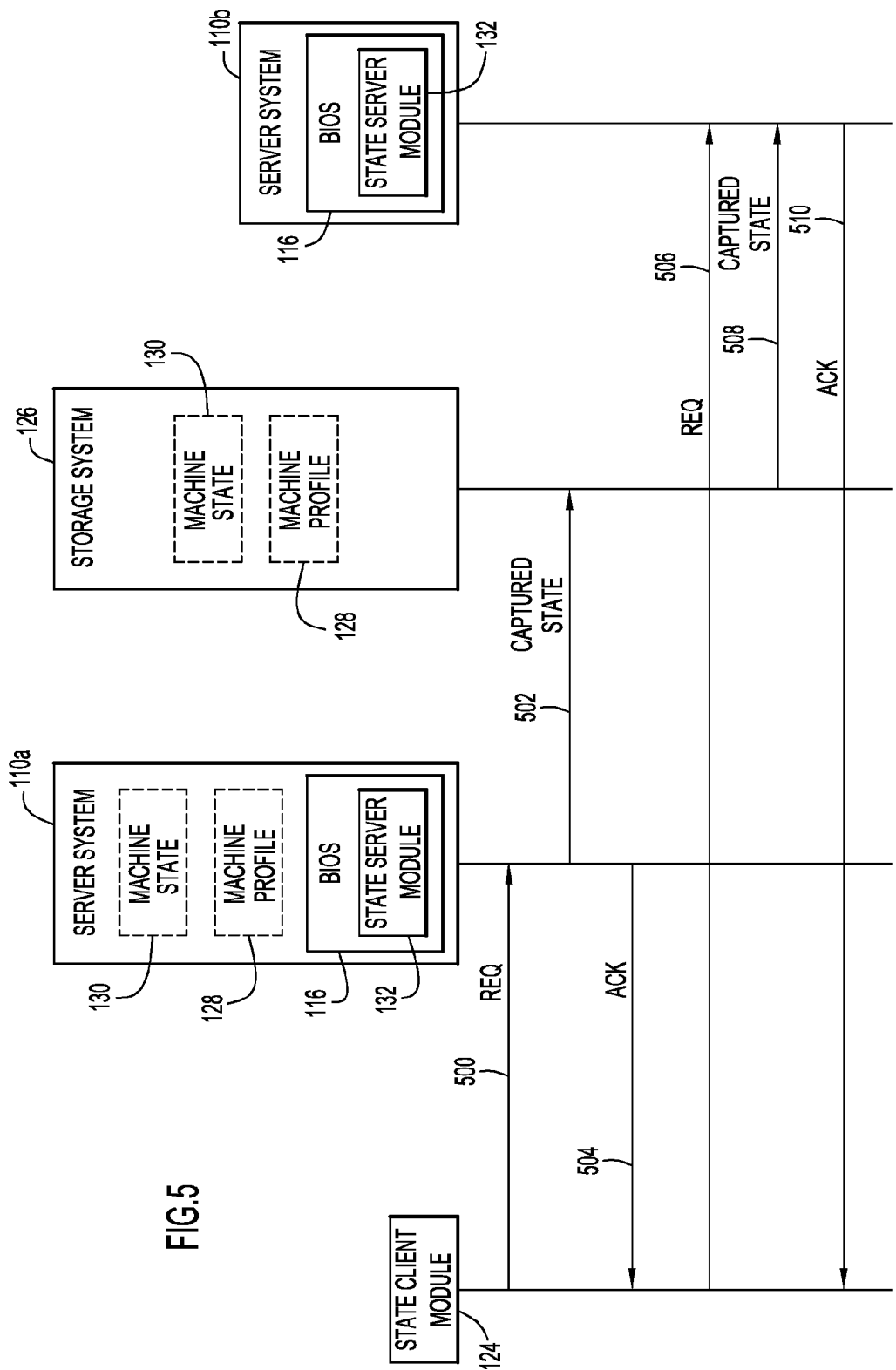
FIG. 5 is a flow diagram of a manner of storing and transferring a physical machine state to a different physical machine according to an embodiment.

Operation of an embodiment to store a physical machine state and transfer the physical machine to another physical machine is illustrated, by way of example, in FIG. 5. Initially, state client module 124 of a server or client system 110, 114 initiates storage of a state of a server system or physical machine 110*a*. This initiation may be in response to a predetermined activity (e.g., a scheduled time, occurrence of a certain fault or other condition, etc.), or a request from a user (e.g., entered via a graphical user or other interface, etc.) interacting with the server or client system. State client module 124 of the server or client system transmits a request to state server module 132 of physical machine 110*a* the state of which is to be stored at flow 500. By way of example, the request may be in the form of one or more commands, and include a pause command and a push command as described above. The state server module processes the pause command, and freezes the operational state of physical machine 110*a* to avoid further changes due to operation of the machine. The operational state (e.g., machine profile 128 and machine state 130) is captured, and the push command is processed to direct state server module 132 to transfer the captured operational state (e.g., machine profile 128 and machine state 130) from physical machine 110*a* to storage system 126 at flow 502. The state client module may further issue a release command to release physical machine 110*a* from performing server tasks (e.g., processing requests, etc.). Once the operational state is stored, physical machine 110*a* no longer contains the operational state.

The state server module may generate an identifier for the captured operational state to enable subsequent retrieval in order to restore the physical machine. In addition, the push command may include a parameter (e.g., Uniform Resource Locator (URL) or other address, device or system, etc.) to designate a desired location or destination to store the captured operational state. State server module 132 sends an acknowledgment to state client module 124 to indicate completion of storage of the physical machine state at flow 504. The acknowledgment may include the identifier for the captured operational state to enable subsequent retrieval in order to restore the physical machine.

Once the physical machine state is stored, state client module 124 of the server or client system transmits a request to state server module 132 of a server system or physical machine 110*b* designated to receive the retrieved state at flow 506. By way of example, the request may be in the form of one or more commands, and include a get command as described above. The state server module processes the get command, and retrieves the stored state of physical machine 110*a* from storage system 126. The state server module may provide an identifier within the request to storage system 126 to enable retrieval of the state of physical machine 110*a*. In addition, the get command may include one or more parameters (e.g., Uniform Resource Locator (URL) or other address, device or system, identifier for the captured physical machine state, etc.) to designate a desired location or destination from which to retrieve the captured physical machine state, and/or to indicate the specific physical machine state to be retrieved as described above.

The stored physical machine state (e.g., machine profile 128 and machine state 130) is retrieved and transferred from storage system 126 to physical machine 110*b* at flow 508. State server module 132 of physical machine 110*b* configures that machine based on the retrieved state to implement captured physical machine 110*a*. Since the information within the stored physical machine state (e.g., machine profile 128 and machine state 130) reflects the operating state of physical machine 110*a* at the time of capture, physical machine 110*b* may be configured to operate in substantially the same manner as captured physical machine 110*a* from the point of the capture.

The request from state client module 124 to state server module 132 of physical machine 110*b* for retrieval of the captured state of physical machine 110*a* may include a start command to control restoration of the captured physical machine as described above. For example, the start command may indicate an immediate restoration upon receipt of the retrieved physical machine state, a predetermined time for the restoration, and/or conditions triggering the restoration. Alternatively, a start command may subsequently be issued by state client module 124 for state server module 132 of physical machine 110*b* at a later time to initiate restoration of captured physical machine 110*a*. In this case, physical machine 110*b* remains idle until receipt of the start command from state client module 124. State server module 132 of physical machine 110*b* sends an acknowledgment to state client module 124 to indicate completion of the transfer of captured physical machine 110*a* to physical machine 110*b* at flow 510.

The storage of physical machine state and restoration of the physical machine may be employed for various applications. For example, when the computing requirements for a server system or physical machine are low, the operational state of the server system may be captured and stored within the storage system in order to suspend operation of the server system. The operation of the server system may be suspended for some period of time to reduce power and cooling costs for a data center. The server system may later be configured with the stored state and restored to operate from the point of the capture, thereby conserving power and costs.

Further, a server system may need some required repairs or maintenance. In this case, the state of the server system or physical machine may be temporarily stored within the storage system in order to perform the repairs or maintenance. Once the repairs or maintenance have been completed, the server system may be restored based on the stored state to operate from the point of the capture. This capability avoids the need to shutdown and later re-boot the server system, and/or to shutdown all hosted virtual machines (VMs) in order to perform the repairs or maintenance.

Moreover, these capabilities provide advantages for a hosted virtual desktop (HVD) environment where numerous virtual desktops may be operating even though some of the desktops are not being utilized. In this case, there is a need to avoid shutting down all the hosted desktops since this requires users to boot their machines for a subsequent session. Present embodiments may be utilized to retain the state of the hosted virtual desktop, even though the physical machine may suspended or re-used, until the user is ready to return to the session. The server system (or desktop) may be restored based on the stored state to operate from the point of the capture, thereby avoiding the need to re-boot the physical machines.

In addition, enterprises have dynamic computing requirements based on the time of day, day of the week, quarter of the year, and year end. When there are opposing computing requirements, present embodiments provide for storage of the operational state of a physical machine to enable operation of that machine to be suspended. In this case, a physical machine with a previously stored state may be restored on the suspended machine, thereby preserving all the application states which may include many virtual machines. Thus, the server systems or physical machines may be re-used to conserve resources.

In some cases, a live migration of an entire physical server from one place to another (within or between data centers) may be desired. The physical server may have one operating system (OS) and application executing thereon, or many virtual machines (VMs) executing on a hypervisor. The present embodiments provide the ability to move the software executing on a server system from the current server system to a new similar server system while retaining the state/memory/network of the entire physical machine without any loss of service.

Figure 6:
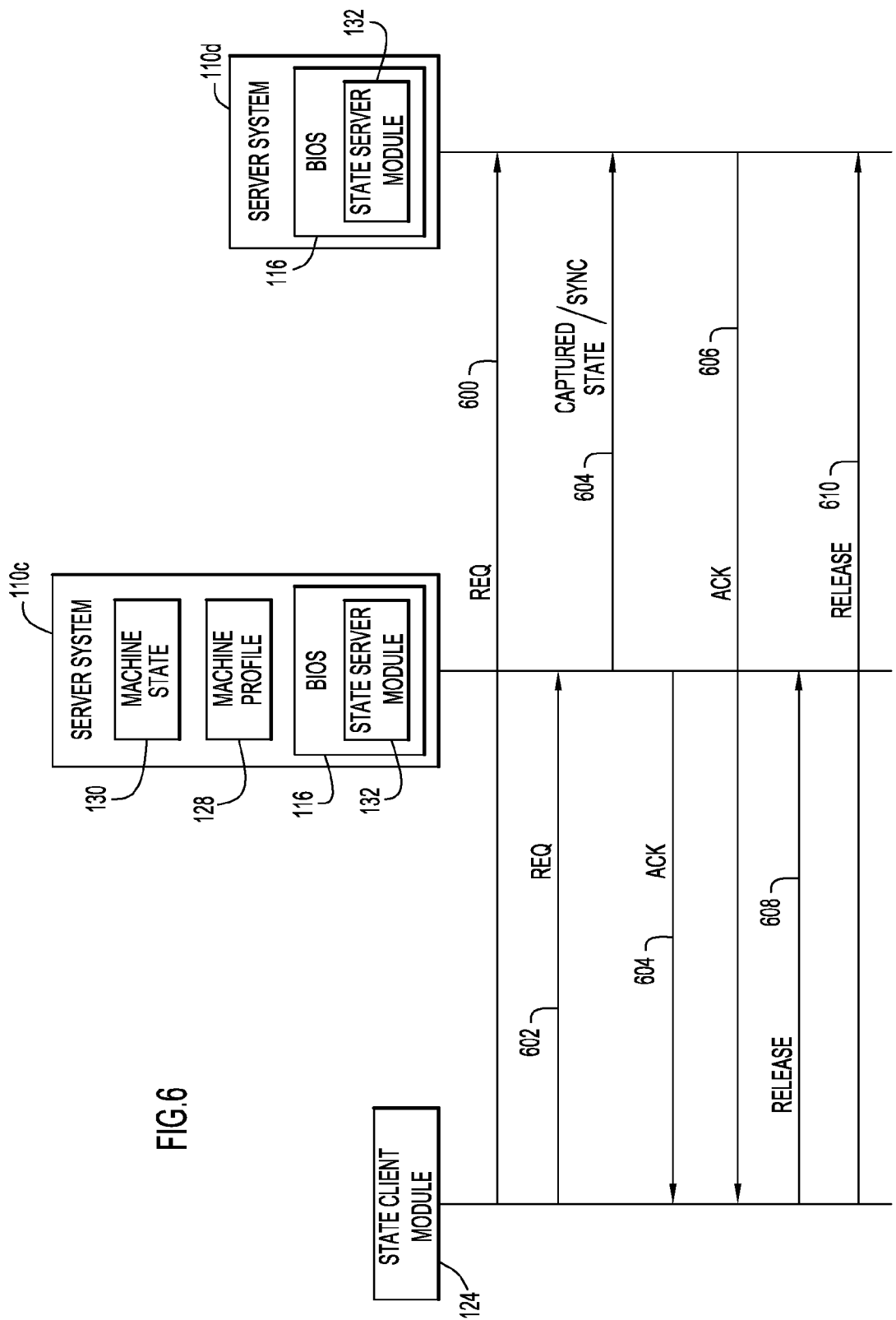
FIG. 6 is a flow diagram of a manner of migrating a physical machine during machine operation according to an embodiment.

Operation of an embodiment to migrate a physical machine during operation of that machine (e.g., live migration) is illustrated, by way of example, in FIG. 6. The migration may be employed for physical and virtualized environments, provides no computing overhead, and lowers complexity to access hardware for maintenance.

Initially, state client module 124 of a server or client system 110, 114 initiates migration of a server system or physical machine 110c to another server system or physical machine 110d. This initiation may be in response to a predetermined activity (e.g., a scheduled time, occurrence of a certain fault or other condition, etc.), or a request from a user (e.g., entered via a graphical user or other interface, etc.) interacting with the server or client system. State client module 124 of the server or client system transmits a request to state server module 132 of physical machine 110d designated as the destination for the migration at flow 600. By way of example, the request may be in the form of one or more commands, and includes a receive command. The state server module of physical machine 110d processes the receive command, and establishes a communication channel (e.g., a Transmission Control Protocol (TCP) socket, etc.) to receive the state of physical machine 110c for the migration.

State client module 124 subsequently issues a request to capture and transfer the state of physical machine 110c at flow 602. By way of example, the request may be in the form of one or more commands, and includes a push command as described above. State server module 132 of physical machine 110c captures the operational state of physical machine 110c, and processes the push command to transfer the captured operational state (e.g., machine profile 128 and machine state 130) to physical machine 110d at flow 604, while physical machine 110c continues to operate.

Since the migration occurs during operation of physical machine 110c, the operational state of physical machine 110c may be dynamically changing during and/or after transfer of the operational state to physical machine 110d. Accordingly, the operational state (e.g., machine profile 128 and machine state 130) received by physical machine 110d is synchronized with the dynamically changing operational state of physical machine 110c at flow 604. The transfer and synchronization of the operational states of physical machines 110c, 110d may take some time to complete, depending upon the changes to the operational state of physical machine 110c. State server module 132 of physical machine 110c records and transmits changes to the machine operational state occurring during and after the transfer of that state to physical machine 110d. The state server module identifies the changes, and transmits the identified changes to physical machine 110d to synchronize the operational states of physical machines 110c, 110d. This synchronization process (e.g., identifying and transmitting changes to the operational state of physical machine 110c) is repeated until the operational states of physical machines 110c, 110d are synchronized (e.g., the operational states of the physical machines are identical).

Once the operational states of the physical machines are synchronized, state server modules 132 of physical machines 110c, 110d each acknowledge synchronization to state client module 124 at flow 606. The machines may continue to run in a highly available synchronized state until the originating machine is released. The state client module issues a release command to state server module 132 of physical machine 110c at flow 608 to release physical machine 110c from performing server tasks (e.g., processing requests, etc.). The state server module of physical machine 110c further transmits the release command to the state server module of physical machine 110d over the established communication channel (e.g., a Transmission Control Protocol (TCP) socket, etc.) at flow 510 to inform physical machine 110d to assume performance of server tasks. State server module 132 of physical machine 110d further closes the established communication channel with physical machine 110c, where physical machine 110d assumes the role of physical machine 110c. Machine profile 128 of physical machine 110c transfers the original physical machine addresses (e.g., Media Control Access (MAC)), while machine state 130 transfers the operating system (OS) assigned address/name (e.g., Internet Protocol (IP) address and hostname) to enable physical machine 110d to continue to operate on the same network.

Once the migration is completed, physical machine 110c may be repaired, or re-used for a different purpose in substantially the same manners described above. Alternatively, state client module 124 may issue a migrate command (e.g., with various parameters (e.g., destination machine address, storage system address, identifier for the stored physical machine state, etc.)) to direct state server modules 132 of physical machines 110c, 110d to perform the migration in substantially the same manner described above.

It will be appreciated that the embodiments described above and illustrated in the drawings represent only a few of the many ways of implementing embodiments for storage and transfer of physical machine state.

The topology or environment of the present embodiments may include any number of computer or other processing systems (e.g., client or end-user systems, server systems, etc.) arranged in any desired fashion, where these embodiments may be applied to any desired type of computing environment (e.g., cloud computing, client-server, network computing, etc.). The computer or other processing systems (e.g., client systems, server systems, etc.) employed by these embodiments may be implemented by any number of any personal or other type of computer or processing system (e.g., IBM-compatible, APPLE, laptop, tablets, gaming consoles, etc.), and may include any commercially available operating system and any commercially available or custom software (e.g., browser software, communications software, server software, machine state software, etc.). These systems may include any types of monitors and input devices (e.g., keyboard, mouse, voice recognition, touch screen, etc.) to enter and/or view information. In addition, the client systems may be implemented by any personal or other type of computer or processing device (e.g., laptop, notebook, personal or other computer system, personal digital assistant (PDA), mobile/cellular telephones, mobile computing devices (e.g., pads, tablets, etc.)).

It is to be understood that the software (e.g., machine state software including the state server module, state client module, etc.) of the present embodiments may be implemented in any desired computer language and could be developed by one of ordinary skill in the computer arts based on the functional descriptions contained in the specification and flow charts and/or diagrams illustrated in the drawings. The software (e.g., machine state software including the state server module, state client module, etc.) of the present embodiments may reside within any suitable device or memory of, or coupled to, a computer or other processing system (e.g., ROM, RAM, BIOS, hard-disk, within an independent memory, peripheral, etc.). Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts and/or diagrams may be modified in any manner that accomplishes the functions described herein. In addition, the functions in the flow charts and/or diagrams or description may be performed in any order that accomplishes a desired operation.

The software of the present embodiments (e.g., machine state software including the state server module, state client module, etc.) may be made available as a program product apparatus or device including a recordable or computer usable or readable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

Further, the memories or other devices (e.g., BIOS, etc.) of the computer systems or devices of present embodiments may comprise read only memory (ROM), random access memory (RAM), magnetic disk storage media devices, optical storage media devices, flash memory devices, electrical, optical, or other physical/tangible memory storage devices. Thus, in general, the memory or other storage device may comprise one or more computer readable storage media (e.g., a memory device) encoded with software or logic comprising computer executable instructions and, when executed (by the corresponding processor of the computer system or device), the software is operable to perform the operations described herein.

The communication network may be implemented by any number of any type of communications network (e.g., LAN, WAN, Internet, Intranet, VPN, etc.). The computer or other processing systems of these embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The storage system may be implemented by any number of any conventional or other databases, data stores or storage structures (e.g., files, databases, data structures, data or other repositories, etc.) to store information. The storage system may be included within or coupled to the server and/or client systems. The storage system may be remote from or local to the computer or other processing systems, and may store any desired data.

The machine profile may include any quantity of any desired information pertaining to the configuration and/or characteristics of the physical machine, corresponding peripherals and/or plug-in components. The machine profile may include any quantity of any types of service profiles each including any desired information pertaining to the configuration and/or characteristics of the physical machine.

The machine state may include any desired information pertaining to the operating or other characteristics of the physical machine (e.g., any processing, working storage or other memories, any program related memories, stacks and/or registers, hard-disk memory, etc.). The machine state may further include any portion of disk or other memory associated with the physical machine. The captured physical machine state may be identified in any desired fashion based on any suitable identifiers. The identifiers may be of any length, and include any suitable numeric and/or alphanumeric characters and/or symbols. The capture and/or transfer of the physical machine state (e.g., machine profile and state) may encompass any desired portions of the machine profile and state. Thus, any portion of the physical machine may be stored, restored, and/or transferred. For example, a certain function or application (e.g., one or more virtual machines, services, etc.) may be suspended (e.g., for maintenance or other tasks, etc.) and/or transferred to another physical machine.

The restoration of the physical machine may be initiated based on any desired criteria (e.g., user input, predetermined time, occurrence of any conditions, receipt of subsequent instructions, etc.). The restoration of a physical machine may be accomplished in any suitable fashion (e.g., copying the stored machine state to corresponding locations in the physical machine, adjusting settings or parameters of the physical machine based on the stored physical machine state, etc.). Further, any portion of the captured physical machine state may be utilized to restore any portion of the physical machine (e.g., functions, applications, one or more virtual machines, services, etc.).

The state client module may direct capture, storage, transfer, and/or restoration of the physical machine state via any suitable communications or correspondence (e.g., commands, instructions, packets, bit coded word, etc.). Present embodiments may utilize any quantity of any suitable commands in any desired order to perform the functions described herein. The commands may be of any type, and include any suitable format and any quantity of any types of parameters (e.g., locations, identifiers, time indications, condition indications, etc.).

Present embodiments may transfer a physical machine during or after operation of the physical machine. The synchronization may be performed for any desired interval to identify changes to the operational state of a physical machine. The changes may be transmitted to the destination machine at any desired intervals and in any fashion. The synchronization may be performed for live or any other transfer of the physical machine. For example, the synchronization may be performed after transfer of a physical machine state where the physical machine was paused for any desired interval. The physical machines may be considered synchronized in response to any portion of the physical machine states matching (e.g., a desired percentage or quantity of information, certain portions of the physical machine states matching, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.).

The interface screens may include any suitable actuators (e.g., links, tabs, etc.) to navigate between the screens in any fashion.

The present embodiments may be utilized with any types of physical machines (e.g., server, client, stand-alone, main frame, etc.) to store, transfer and/or restore the physical machine on the same or different machine. Further, present embodiments may be utilized for physical and/or virtual machines. Moreover, within an enterprise, present embodiments may be utilized in the enterprise data center and enterprise virtual private data center. Within service providers, present embodiments may be used to deliver Infrastructure-As-A-Service (IAAS), Platform-As-A-Service (PAAS), and Software-As-A Service (SAAS). Since Platform-As-A-Service (PAAS) and Software-As-A Service (SAAS) are less likely to employ hypervisors, present embodiments provide greater flexibility at the physical machine level.

It will be understood that the terms "comprises", "comprising", "includes", "including", "has", "have", "having", "with" and the like, when used in this specification and the claims, specify the presence of stated features, but do not preclude the presence or addition of one or more other features.

From the foregoing description, it will be appreciated that the techniques disclosed herein make available novel embodiments for storage and transfer of physical machine state, wherein the capture, storage, and transfer of the state of a physical machine is facilitated by the basic input/output system (BIOS) of the physical machine.

Having described example embodiments of a new and improved technique for storage and transfer of a physical machine state, it is believed that other modifications, variations and changes will be suggested to those skilled in the art in view of the teachings set forth herein. It is therefore to be understood that all such variations, modifications and changes are believed to fall within the scope defined by the appended claims.

What is claimed is:

1. A method comprising:
   capturing an operational state of a physical computing device comprising:
      pausing execution of the physical computing device and operating system thereof;
      determining a static machine profile comprising a static configuration of a plurality of physical component devices associated with the physical computing device, the plurality of physical components including a peripheral coupled to the physical computing device, wherein the static configuration exists independent of execution of the operating system; and
      determining a dynamic machine state comprising dynamically changing states of the physical component devices, wherein the dynamic machine state exists during execution of the operating system and includes an operating state of the peripheral coupled to the physical computing device; and
   configuring a target computing device and a target peripheral with said captured operational state comprising the static machine profile and dynamic machine state to continue operations of said physical computing device and said peripheral coupled to the physical computing device on said target computing device and said target peripheral.

2. The method of claim 1, wherein said operating system is a hypervisor.

3. The method of claim 1, wherein said capturing said operational state includes:

storing said captured operational state in a storage system; and
suspending operation of said physical computing device in response to storage of said captured operational state.

4. The method of claim 3, wherein said configuring said target computing device with said captured operational state includes:
   retrieving said captured operational state from said storage system; and
   transferring said captured operational state to said target computing device.

5. The method of claim 1, wherein said configuring said target computing device with said captured operational state includes:
   transferring the captured operational state comprising the static machine profile and dynamic machine state from the physical computing device to the target computing device during operation of the physical computing device wherein the physical computing device continues to operate after the operational state is transferred to the target computing device;
   detecting whether there has been an alteration in the static machine profile or dynamic machine state of the operational state after transferring the captured operational state from the physical computing device to the target computing device; and
   synchronizing, in response to detecting that there has been an alteration in the operational state after transferring the captured operational state, operational states including the static machine profile and dynamic machine state of the physical computing device and the target computing device.

6. The method of claim 1, further including:
   generating one or more commands from a control computing device to direct said physical computing device to capture said operational state and to direct said target computing device to configure said target computing device with said captured operational state.

7. The method of claim 1, wherein said physical computing device and said target computing device each include a server system.

8. The method of claim 1, wherein said physical computing device and said target computing device each include a basic input/output system (BIOS) with instructions, and said method includes:
   executing said instructions from said BIOS of said physical computing device to capture said operational state of said physical computing device; and
   executing said instructions from said BIOS of said target computing device to configure said target computing device with said captured operational state.

9. An apparatus comprising:
   a physical computing device including:
      a network interface configured to enable communications over a network; and
      at least one processor configured to:
         pause execution of the physical computing device and operating system thereof;
         capture a static machine profile of an operational state comprising a static configuration of a plurality of physical component devices associated with the physical computing device, the plurality of physical component devices including a peripheral coupled to the physical computing device, wherein the static configuration exists independent of execution of the operating system;

capture a dynamic machine state of the operational state comprising dynamically changing states of the physical component devices, wherein the dynamic machine state exists during execution of the operating system and includes an operating state of the peripheral coupled to the physical computing device; and configure said physical computing device and said peripheral coupled to the physical computing device with a desired static machine profile and a desired dynamic machine state captured from a desired computing device and a peripheral coupled to the desired computing device to continue operations of said desired computing device and said peripheral coupled to said desired computing device on said physical computing device and said peripheral coupled to said physical computing device.

10. The apparatus of claim 9, wherein said operating system is a hypervisor.

11. The apparatus of claim 9, and further including a storage system to store operational states, and wherein the processor is configured to capture said operational state by:
   storing said captured operational state in said storage system; and
   suspending operation of said physical computing device in response to storage of said captured operational state.

12. The apparatus of claim 11, wherein the processor is further configured to:
   retrieve from said storage system said operational state captured from said desired computing device; and
   transfer said retrieved operational state to said physical computing device.

13. The apparatus of claim 9, wherein the processor is further configured to:
   transfer the captured static machine profile and dynamic machine state from the physical computing device to a target computing device during operation of the physical computing device, wherein the physical computing device continues to operate after the operational state is transferred to the target computing device;
   detect whether there has been an alteration in the static machine profile or dynamic machine state after transferring the captured static machine profile and dynamic machine state from said physical computing device to the target computing device; and
   synchronize, in response to detecting that there has been an alteration in the static machine profile or dynamic machine state after transferring the static machine profile and dynamic machine state, the static machine profile and dynamic machine state of the physical computing device with the target computing device.

14. The apparatus of claim 9, further including:
   a control computing device configured to generate one or more commands to direct said physical computing device to capture said operational state and configure said physical computing device with said operational state captured from said desired computing device.

15. The apparatus of claim 9, wherein said physical computing device and said desired computing device each include a server system.

16. The apparatus of claim 9, wherein said physical computing device includes a basic input/output system (BIOS) with instructions, and said at least one processor executes said instructions from said BIOS to capture said operational state of said physical computing device and configure said physical computing device with said operational state captured from said desired computing device.

17. One or more non-transitory computer-readable storage media encoded with software comprising computer executable instructions and when the software is executed by a processor operable to:
   pause execution of a physical computing device and operating system thereof;
   capture a static machine profile of an operational state comprising a static configuration of a plurality of physical component devices associated with the physical computing device, the plurality of physical component devices including a peripheral coupled to the physical computing device, wherein the static configuration exists independent of execution of the operating system; and
   capture a dynamic machine state of the operational state comprising dynamically changing states of the physical component devices, wherein the dynamic machine state exists during execution of the operating system and includes an operating state of the peripheral coupled to the physical computing device; and
   configure a target computing device and a target peripheral with said captured static machine profile and dynamic machine state to continue operations of said physical computing device and said peripheral coupled to the physical computing device on said target computing device and said target peripheral.

18. The computer-readable storage media of claim 17, wherein said operating system is a hypervisor.

19. The computer-readable storage media of claim 17, wherein the instructions that are operable to capture said operational state comprise instructions operable to:
   store said captured operational state in a storage system; and
   suspend operation of said physical computing device in response to storage of said captured operational state.

20. The computer-readable storage media of claim 19, wherein the instructions that are operable to configure said target computing device with said captured operational state comprise instructions operable to:
   retrieve said captured operational state from said storage system; and
   transfer said captured operational state to said target computing device.

21. The computer-readable storage media of claim 17, wherein the instructions that are operable to configure said target computing device with said captured static machine profile and dynamic machine state comprise instructions operable to:
   transfer the captured static machine profile and dynamic machine state from the physical computing device to the target computing device during operation of said physical computing device;
   detect whether there has been an alteration in the static machine profile and dynamic machine state after transferring the captured static machine profile and dynamic machine state from the physical computing device to the target computing device; and
   synchronize, in response to detecting that there has been an alteration in the static machine profile or dynamic machine state after transferring the captured static machine profile and dynamic machine state, the static machine profile and dynamic machine state of the physical computing device and the static machine profile and dynamic machine state of the target computing device.

22. The computer-readable storage media of claim 17, wherein the software executed by said processor is further operable to:
   generate one or more commands to direct said physical computing device to capture said operational state and to direct said target computing device to configure said target computing device with said captured operational state.

23. The computer-readable storage media of claim 17, wherein said computer-readable storage media include a basic input/output system (BIOS).

* * * * *